(12) United States Patent
Tomita et al.

(10) Patent No.: US 9,362,796 B2
(45) Date of Patent: Jun. 7, 2016

(54) ELECTRICITY COLLECTION AND DISTRIBUTION RING AND ELECTRIC MOTOR

(71) Applicant: Hitachi Metals, Ltd., Tokyo (JP)

(72) Inventors: Kazuhiko Tomita, Mito (JP); Kenichi Egami, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 321 days.

(21) Appl. No.: 14/133,832

(22) Filed: Dec. 19, 2013

(65) Prior Publication Data

US 2014/0175921 A1 Jun. 26, 2014

(30) Foreign Application Priority Data

Dec. 20, 2012 (JP) ................................. 2012-277794

(51) Int. Cl.
*H02K 11/00* (2006.01)
*H02K 3/50* (2006.01)
*H02K 3/52* (2006.01)

(52) U.S. Cl.
CPC .................. *H02K 3/50* (2013.01); *H02K 3/522* (2013.01); *H02K 2203/09* (2013.01)

(58) Field of Classification Search
CPC ..... H02K 2203/09; H02K 3/50; H02K 3/522; H02K 13/00
USPC .......................................................... 310/71
See application file for complete search history.

(56) References Cited

U.S. PATENT DOCUMENTS

| 8,816,550 | B2* | 8/2014 | Kim ...................... | B65D 5/0403 310/43 |
| 2003/0090166 | A1* | 5/2003 | Kobayashi ............. | H02K 3/522 310/144 |
| 2003/0094879 | A1* | 5/2003 | Kobayashi ............. | H02K 3/522 310/238 |
| 2003/0173841 | A1 | 9/2003 | Kobayashi et al. | |
| 2009/0039720 | A1* | 2/2009 | Tsukashima ........... | H02K 3/522 310/71 |
| 2009/0256439 | A1 | 10/2009 | Inoue et al. | |
| 2011/0133581 | A1 | 6/2011 | Ha | |
| 2012/0037436 | A1* | 2/2012 | Kwon ...................... | H02K 3/50 180/65.1 |
| 2012/0286593 | A1 | 11/2012 | Yokogawa et al. | |
| 2012/0293024 | A1 | 11/2012 | Yokogawa et al. | |
| 2012/0319512 | A1 | 12/2012 | Nakagawa | |

FOREIGN PATENT DOCUMENTS

JP 2003134753 A 5/2003
JP 2009-261082 A 11/2009

OTHER PUBLICATIONS

The Japanese Office Action dated Jul. 7, 2015 and its English translation.

* cited by examiner

*Primary Examiner* — Hanh Nguyen
(74) *Attorney, Agent, or Firm* — Roberts Mlotkowski Safran & Cole, PC

(57) ABSTRACT

An electricity collection and distribution ring includes a plurality of bus rings that include a plurality of annular conductive bodies and a plurality of connecting terminals provided on the annular conductive bodies. The connecting terminals each include a first connecting portion connected to a center conductor, a second connecting portion connected to a winding and a coupling portion for coupling the first and second connecting portions. The coupling portion includes the first extended portion including an end portion extending through a gap between the annular conductive bodies toward one side in an axial direction of the annular conductive bodies and the second extended portion extending from the end portion of the first extended portion toward one side in a radial direction of the annular conductive bodies. The second connecting portion is formed at an end portion of the second extended portion on one side in the radial direction.

5 Claims, 7 Drawing Sheets

ELECTRICITY COLLECTION AND DISTRIBUTION RING AND ELECTRIC MOTOR

The present application is based on Japanese patent application No. 2012-277794 filed on Dec. 20, 2012, the entire contents of which are incorporated herein by reference.

BACKGROUND OF THE INVENTION

1. Field of the Invention

The invention relates to an electricity collection and distribution ring for collecting and distributing currents from/to windings wound around plural teeth, and an electric motor having the electricity collection and distribution ring as well as a rotor and a stator.

2. Description of the Related Art

An electricity collection and distribution ring is known that is used for collecting and distributing motor current (power collection and power distribution) from/to windings of a stator in, e.g., a three-phase AC motor (see, e.g., JP-A-2003-134753 and JP-A-2009-261082).

The electricity collection and distribution ring (centralized power distribution member) disclosed in JP-A-2003-134753 is formed by arranging three annular bus bars in a housing space of an insulating holder so as to be parallel in a radial direction. Each bus bar has integrally an annular conductor portion, a terminal area provided on the annular conductor portion at a circumferential position, and tubs provided on the annular conductor portion at plural circumferential positions. For forming the bus bar, a potion to be the annular conductor portion, together with portions to be the terminal area and the tubs, is stamped out of a conductive metal sheet as a raw material by a die and is bent into an annular shape. A motor current is supplied to the terminal area and windings of the motor are connected to the tubs.

The electricity collection and distribution ring disclosed in JP-A-2009-261082 is formed by arranging annular lead frames in a line in an axial direction. Each lead frame is configured such that a conductive wire having an insulation cover is shaped into an annular shape and both end portions thereof protruding radially outward and bent toward one side in the axial direction are connected to a power supply terminal. In addition, the lead frame has conductor-exposed portions exposed by removing the insulation cover at plural positions in a circumferential direction and connecting terminals are connected to the conductor-exposed portions by, e.g., fusing (heat staking). A motor current is supplied to the power supply terminal and windings of the motor are connected to the connecting terminals.

SUMMARY OF THE INVENTION

In shaping the bus bar disclosed in JP-A-2003-134753, a belt-shaped shaping workpiece obtained by stamping the conductive metal sheet is bent into an annular shape, and then, the portions to be the tubs are bent radially inward and the portion to be the terminal area is bent radially outward, as shown in FIG. 28 of JP-A-2003-134753. In this manufacturing method, a portion of the conductive metal sheet is used as the belt-shaped shaping workpiece but the remaining portion is not used. Therefore, a large amount of material is wasted.

The lead frame disclosed in JP-A-2009-261082 is formed by bending a conductive wire into an annular shape and it is thus possible to significantly reduce material loss as compared to the bus bar disclosed in JP-A-2003-134753. However, plural lead frames arranged in a line in an axial direction causes an increase in the axial size.

In addition, if the lead frames disclosed in JP-A-2009-261082 are arranged in parallel in a radial direction together with connecting terminals, it is necessary to bend the windings one by one to lead to connecting portions of the connecting terminals after arranging the electricity collection and distribution ring in a line along an axial direction of a stator. This causes an increase in man-hours for connecting the electricity collection and distribution ring to the stator.

It is an object of the invention to provide an electricity collection and distribution ring that allows the easy connection of an annular conductive body to the wirings of the stator, in which the annular conductive body includes an insulated wire with a conductor covered by an insulation, as well as an electric motor using the electricity collection and distribution ring.

(1) According to one embodiment of the invention, an electricity collection and distribution ring, comprises a plurality of bus rings for collecting and distributing currents from/to multiple-phase windings wound around a plurality of circularly-arranged teeth, wherein the plurality of bus rings comprise a plurality of annular conductive bodies each formed by covering a center conductor with an insulation and a plurality of connecting terminals provided on the annular conductive bodies at a plurality of circumferential positions, wherein the plurality of annular conductive bodies are arranged concentrically and parallel in a radial direction, wherein the plurality of connecting terminals each comprise a first connecting portion connected to the center conductor, a second connecting portion connected to the winding and a coupling portion for coupling the first and second connecting portions, wherein the coupling portion comprises first and second extended portions, the first extended portion comprising an end portion extending through a gap between the plurality of annular conductive bodies toward one side in an axial direction of the plurality of annular conductive bodies and the second extended portion extending from the end portion of the first extended portion toward one side in a radial direction of the plurality of annular conductive bodies, and wherein the second connecting portion is formed at an end portion of the second extended portion on one side in the radial direction.

In the above embodiment (1) of the invention, the following modifications and changes can be made.

(i) The second connecting portion comprises a folded-back piece formed by folding at an end portion on one side in the radial direction to extend back toward another side in the radial direction.

(ii) The coupling portion further comprises an arc portion between the first connection portion and a base end portion of the first extended portion, the arc portion being formed in an arc shape along a circumferential direction of the plurality of annular conductive bodies.

(ii) The plurality of connecting terminals are each formed by bending a plate-shaped conductive member, and wherein the coupling portion is arranged between the plurality of annular conductive bodies so that a thickness direction of the conductive member in the first extended portion is along the radial direction of the plurality of annular conductive bodies.

(2) According to another embodiment of the invention, an electric motor comprises:

the electricity collection and distribution ring according to the embodiment (1);

a stator comprising the plurality of teeth and the multiple-phase windings wound therearound; and a rotor that is rotated with respect to the stator by a magnetic field of the multiple-phase winding.

Effects of the Invention

According to one embodiment of the invention, an electricity collection and distribution ring can be provided that allows the easy connection of an annular conductive body to the wirings of the stator, in which the annular conductive body includes an insulated wire with a conductor covered by an insulation, as well as an electric motor using the electricity collection and distribution ring.

BRIEF DESCRIPTION OF THE DRAWINGS

Next, the present invention will be explained in more detail in conjunction with appended drawings, wherein:

FIGS. 2A and 2B show first to fourth bus rings, wherein FIG. 2A is a plan view and FIG. 2B is an enlarged view showing the first to fourth bus rings housed in a holding member in the periphery of power supply terminals;

FIGS. 3A to 3C are perspective views showing first to third connecting terminals, wherein FIG. 3A shows the first connecting terminal, FIG. 3B shows the second connecting terminal and FIG. 3C shows the third connecting terminal;

FIGS. 4A and 4B show the second connecting terminal and the periphery thereof, wherein FIG. 4A is a top view and FIG. 4B is a cross sectional view taken on line A-A of FIG. 4A;

FIGS. 6A and 6B show a second connecting terminal and the periphery thereof in a second embodiment of the invention, wherein FIG. 6A is a top view and FIG. 6B is a cross sectional view taken on line B-B of FIG. 6A; and FIGS. 7A and 7B show a second connecting terminal and the periphery thereof in a third embodiment of the invention, wherein FIG. 7A is a top view and FIG. 7B is a cross sectional view taken on line C-C of FIG. 7A.

DETAILED DESCRIPTION OF THE PREFERRED EMBODIMENTS

First Embodiment

Figure 1:
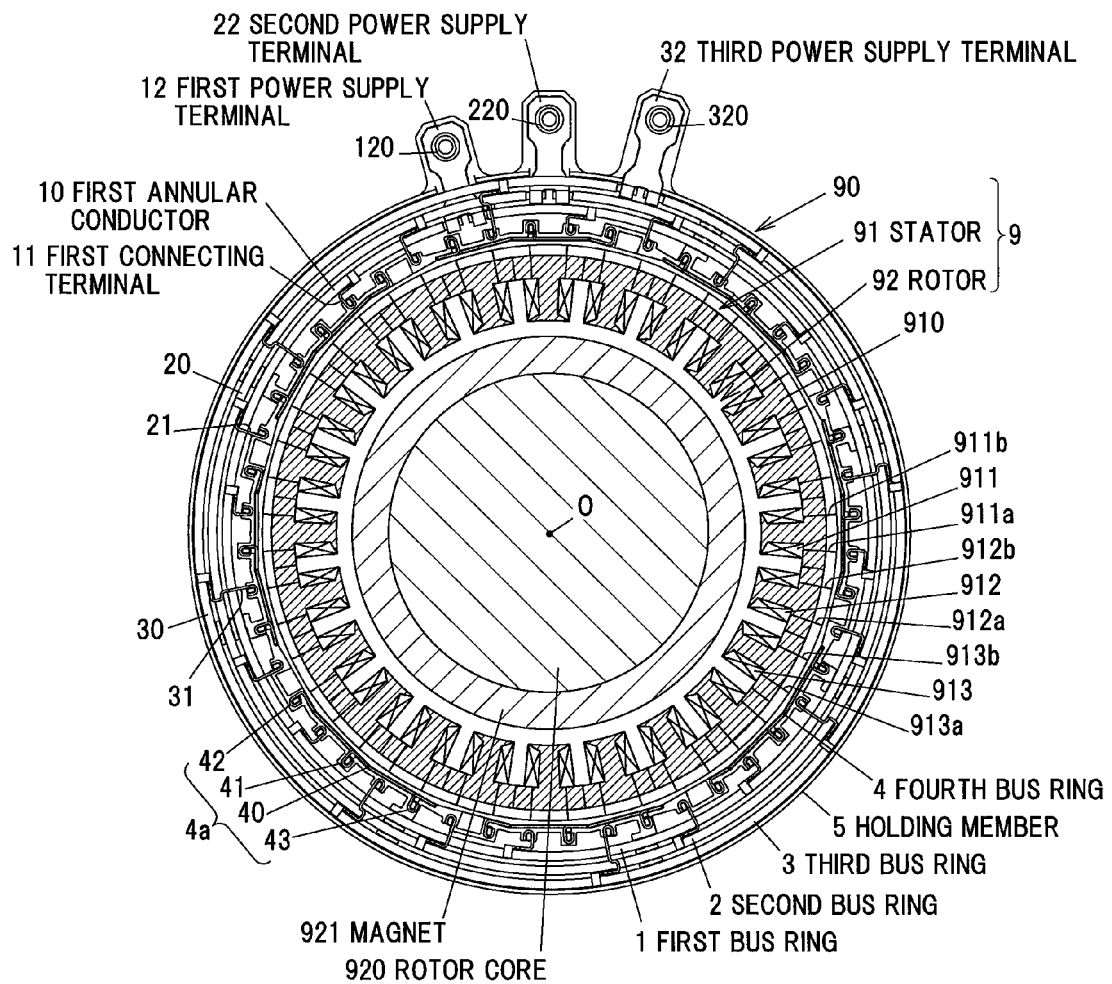
FIG. 1 is an explanatory diagram illustrating a structural example of an electricity collection and distribution ring in a first embodiment of the present invention and an electric motor provided therewith.
Figure 2A:
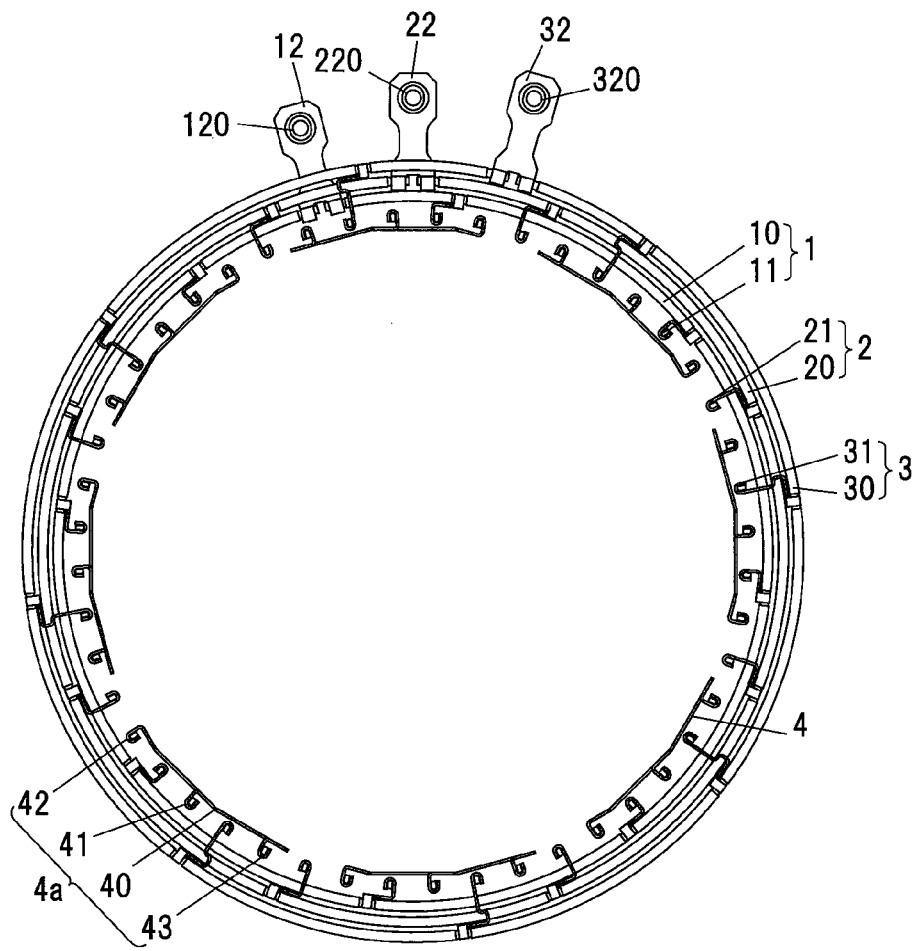
Figure 2B:
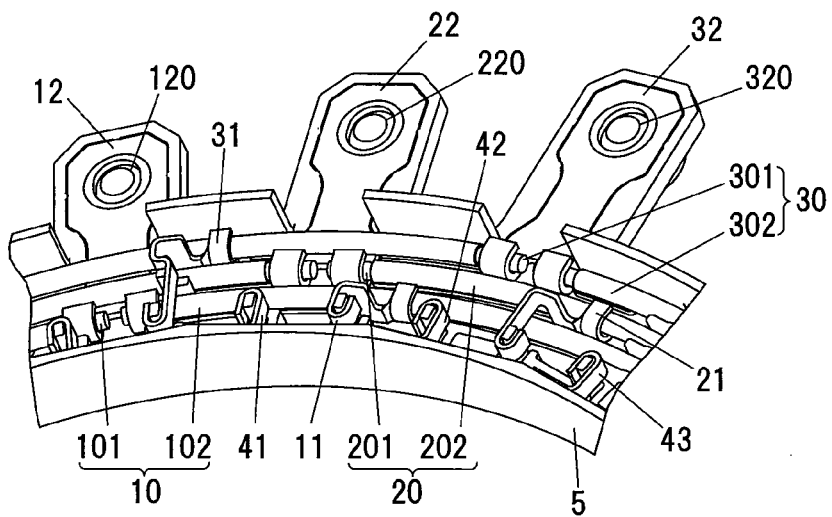

FIG. 1 is an explanatory diagram illustrating a structural example of an electricity collection and distribution ring in the first embodiment of the invention and an electric motor provided therewith. FIGS. 2A and 2B show first to fourth bus rings 1 to 4, wherein FIG. 2A is a plan view and FIG. 2B is an enlarged view showing the first to fourth bus rings 1 to 4 housed in a holding member 5 in the periphery of power supply terminals.

Structure of Electricity Collection and Distribution Ring 90 and Electric Motor 9

An electric motor 9 is a three-phase AC motor provided with a stator 91, a rotor 92 and an electricity collection and distribution ring 90 for collecting and distributing motor current from/to the stator 91. Note that, although the electricity collection and distribution ring 90 and the stator 91 in the electric motor 9 are aligned along a rotational axis line O of the rotor 92, the stator 91 in FIG. 1 is shown inside the electricity collection and distribution ring 90 as a matter of convenience. The electric motor 9 is used as, e.g., a driving source for running a vehicle.

Multiple phase windings 911, 912 and 913 each covered with an insulation cover of e.g., enamel are wound around plural teeth 910 formed of a magnetic material and circularly arranged about a rotational axis line O, thereby forming the stator 91. The U-phase winding 911, the V-phase winding 912 or the W-phase winding 913 is wound around each tooth 910. U-phase, V-phase and W-phase currents are respectively supplied to the multiple phase windings 911, 912 and 913. Here, the rotational axis line O is the center of the circularly-arranged plural teeth 910 and substantially coincides with the axis of rotation of the rotor 92.

The electricity collection and distribution ring 90 is provided with the first to fourth bus rings 1 to 4 for collecting and distributing power from/to the windings 911, 912 and 913, and the annular holding member 5 for holding the first to fourth bus rings 1 to 4.

The first bus ring 1 has a first annular conductor 10 as an annular conductive body formed of an annular insulated wire centered at the rotational axis line O, plural first connecting terminals 11 (eight in the first embodiment) connecting the first annular conductor 10 to the U-phase windings 911, and a power supply terminal 12 for supplying electricity to the first annular conductor 10. Both ends of the insulated wire of the first annular conductor 10 are crimped and fixed to the power supply terminal 12.

The second bus ring 2 has a second annular conductor 20 formed of an annular insulated wire centered at the rotational axis line O, plural second connecting terminals 21 (eight in the first embodiment) connecting the second annular conductor 20 to the V-phase windings 912, and a power supply terminal 22 for supplying electricity to the second annular conductor 20. Both ends of the insulated wire of the second annular conductor 20 are crimped and fixed to the power supply terminal 22.

Likewise, the third bus ring 3 has a third annular conductor 30 formed of an annular insulated wire centered at the rotational axis line O, plural third connecting terminals 31 (eight in the first embodiment) connecting the third annular conductor 30 to the W-phase windings 913, and a power supply terminal 32 for supplying electricity to the third annular conductor 30. Both ends of the insulated wire of the third annular conductor 30 are crimped and fixed to the power supply terminal 32.

The first to third annular conductors 10 to 30 are concentrically arranged in parallel such that the first annular conductor 10 is located on the radially inner side of the second annular conductor 20 and the third annular conductor 30 is located on the radially outer side of the second annular conductor 20. In other words, the second annular conductor 20 is formed to have a larger diameter than the first annular conductor 10 and is arranged around the outer periphery of the first annular conductor 10, and the third annular conductor 30 is formed to have a larger diameter than the second annular conductor 20 and is arranged around the outer periphery of the second annular conductor 20.

The first to third power supply terminals 12, 22 and 32 protrude outward in a radial direction of the first to third annular conductors 10 to 30 and are connected to an inverter via non-illustrated feeder wires. Cylindrical conductive rings 120, 220 and 320 for increasing an axial thickness to allow connection of terminals of the feeder wires are fixed to the power supply terminals 12, 22 and 32 by, e.g., press-fitting.

The first to third bus rings 1 to 3 distribute motor current output from the inverter respectively to the U-, V- and W-phase windings 911, 912 and 913 of the electric motor 9. The fourth bus ring 4 is a neutral-phase bus ring of the stator 91 and respective end portions of the windings 911, 912 and 913 are connected to the fourth bus ring 4.

The fourth bus ring 4 is composed of plural arcuate conductors 4a (eight in the first embodiment) each having an arc shape, and is formed in an annular shape as a whole by arranging the arcuate conductors 4a along a circumferential direction of the holding member 5. The arcuate conductor 4a is formed by plastically deforming a plate-shaped conductive material having a predetermined shape. The arcuate conductor 4a has integrally an arc portion 40 formed in an arc shape by bending at plural positions and first to third neutral connecting terminals 41 to 43 protruding radially outward from the arc portion 40.

A one end portion 911a of the U-phase winding 911 is electrically connected to the first annular conductor 10 via the first connecting terminal 11. Another end portion 911b of the U-phase winding 911 is electrically connected to the first neutral connecting terminal 41 of the fourth bus ring 4. Likewise, one end portions 912a and 913a of the V- and W-phase windings 912 and 913 are electrically connected to the second and third annular conductors 20 and 30 via the second and third connecting terminals 21 and 31 and other end portions 912b and 913b of the windings 912 and 913 are electrically connected to the second and third neutral connecting terminals 42 and 43 of the fourth bus ring 4.

The rotor 92 has a rotor core 920 rotatably supported by a non-illustrated shaft bearing so as to be coaxial with the stator 91 and a magnet 921 having plural magnetic poles and fixed to an outer peripheral surface of the rotor core 920.

Motor currents having sine waveforms 120 degrees out of phase with each other are respectively supplied to the U-, V- and W-phase windings 911, 912 and 913 from the non-illustrated inverter and this creates a rotating magnetic field in the stator 91. The magnet 921 receives a torque generated by an attractive force and a repulsive force of the rotating magnetic field and the rotor 92 is rotated with respect to the stator 91 by the torque.

The first annular conductor 10 is a round wire having a circular cross section, and has a center conductor 101 formed of a highly conductive metal such as copper and an insulation cover 102 formed of an insulating resin and covering the outer periphery of the center conductor 101. At connecting portions of the first annular conductor 10 to be connected to the first connecting terminals 11 and the first power supply terminal 12, an end portion of each first connecting terminal 11 and an end portion of the first power supply terminal 12 are fixed by crimping to the center conductor 101 exposed by removing the insulation cover 102.

Likewise, the second annular conductor 20 has a center conductor 201 and an insulation cover 202 and, at connecting portions to be connected to the second connecting terminals 21 and the second power supply terminal 22, an end portion of each second connecting terminal 21 and an end portion of the second power supply terminal 22 are fixed by crimping to the center conductor 201 exposed by removing the insulation cover 202. And likewise, the third annular conductor 30 has a center conductor 301 and an insulation cover 302 and, at connecting portions to be connected to the third connecting terminals 31 and the third power supply terminal 32, an end portion of each third connecting terminal 31 and an end portion of the third power supply terminal 32 are fixed by crimping to the center conductor 301 exposed by removing the insulation cover 302.

The one end portions 911a, 912a and 913a of the windings 911, 912 and 913 are inserted in an axial direction through insertion holes formed on a bottom of the holding member 5 and are respectively connected to the first to third connecting terminals 11, 21 and 31. Meanwhile, the other end portions 911b, 912b and 913b of the windings 911, 912 and 913 are inserted in an axial direction through insertion holes formed on the bottom of the holding member 5 and are respectively connected to the first to third neutral connecting terminals 41 to 43 of the fourth bus ring 4.

Structure of First to Third Connecting Terminals 11, 21 and 31

Figure 3A:
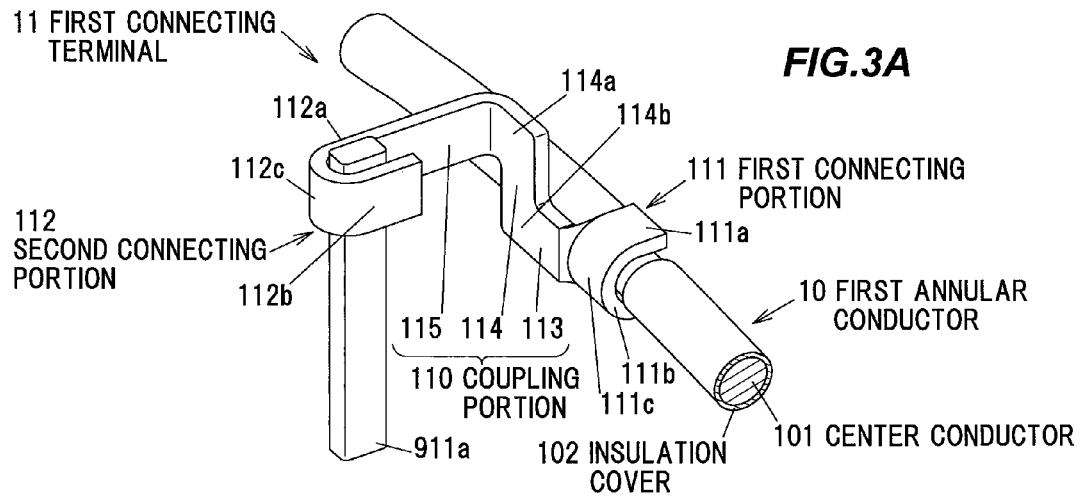
Figure 3B:
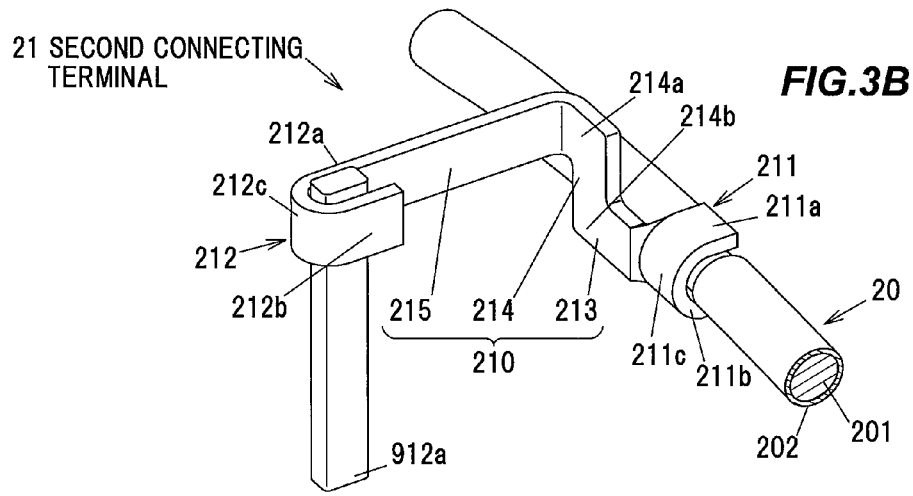
Figure 3C:
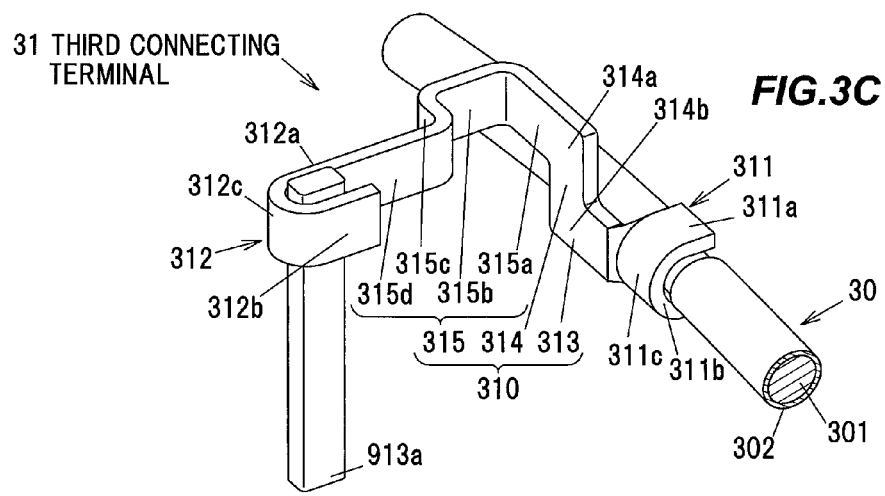
Figure 4A:
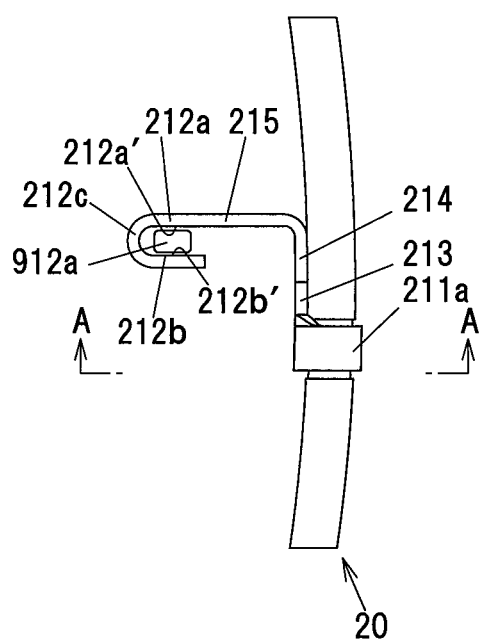
Figure 4B:
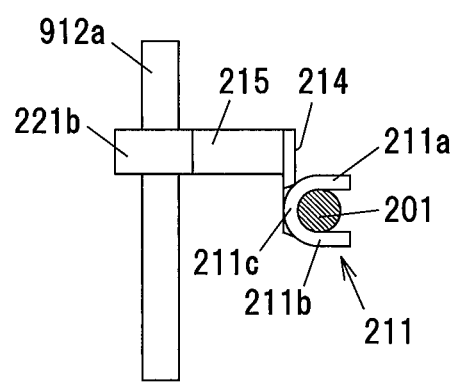

FIGS. 3A to 3C are perspective views showing the first to third connecting terminals 11, 21 and 31, wherein FIG. 3A shows the first connecting terminal 11, FIG. 3B shows the second connecting terminal 21 and FIG. 3C shows the third connecting terminal 31. FIGS. 4A and 4B show the second connecting terminal 21 and the periphery thereof wherein FIG. 4A is a top view and FIG. 4B is a cross sectional view taken on line A-A of FIG. 4A.

In the first embodiment, the first to third connecting terminals 11, 21 and 31 are each formed by plastically deforming a plate-shaped conductive member having a predetermined shape.

The first connecting terminal 11 has a first connecting portion 111 connected to the center conductor 101 of the first annular conductor 10, a second connecting portion 112 connected to the one end portion 911a of the winding 911 and a coupling portion 110 for coupling the first connecting portion 111 to the second connecting portion 112. The second connecting portion 112 is located inward with respect to the first connecting portion 111 in the radial direction of the first annular conductor 10.

The coupling portion 110 has a first extended portion 114, a second extended portion 115 and an arc portion 113. The first extended portion 114 has an end portion 114a which extends through a gap between the first annular conductor 10 and the arcuate conductor 4a toward one side in the axial direction of the first annular conductor 10 (toward the opposite side to the holding member 5). The second extended portion 115 extends inward in the radial direction of the first annular conductor 10 from the end portion 114a of the first extended portion 114 toward the second connecting portion 112. The arc portion 113 is formed between the first connecting portion 111 and a base end portion 114b of the first extended portion 114 so as to have an arc shape along a circumferential direction of the first annular conductor 10. Interposition of the arc portion 113 between the first connecting portion 111 and the first extended portion 114 reduces chance of contact between a tool, etc., and the coupling portion 110 or the second connecting portion 112, etc., when crimping the first connecting portion 111 to the center conductor 101 of the first annular conductor 10, which facilitates crimping work.

The first connecting portion 111 has a pair of protruding pieces 111a and 111b facing each other with the center conductor 101 therebetween and a curved portion 111c which has a semicircular cross section and is interposed between the protruding pieces 111a and 111b. When crimping the first connecting portion 111 to the center conductor 101, the protruding pieces 111a and 111b come into contact with the center conductor 101 and the curved portion 111c is thereby formed. The first connecting portion 111 has a C-shape which opens outward in the radial direction of the first annular conductor 10 as viewed from a circumferential direction of the first annular conductor 10.

The second connecting portion 112 is formed at an end portion of the second extended portion 115 on the radially inner side and has a folded-back shape formed by folding at an end portion to extend back toward the radially outer side. In more detail, the second connecting portion 112 has a pair of contact pieces 112a and 112b facing each other with the one end portion 911a of the winding 911 therebetween and a curved portion 112c which has a semicircular cross section and is interposed between the contact pieces 112a and 112b. The contact piece 112a is formed continuously with the second extended portion 115 along an extending direction of the second extended portion 115. The contact piece 112b as a folded-back piece is formed by folding at the curved portion 112c to extend back toward the radially outer side. The second connecting portion 112 is connected to the one end portion 911a of the winding 911 by, e.g., fusing (heat staking).

The second connecting terminal 21 is formed in the same manner as the first connecting terminal 11 except that a second extended portion 215 constituting a coupling portion 210 is longer than the second extended portion 115 of the first connecting terminal 11. That is, the second connecting terminal 21 has a first connecting portion 211 connected to the center conductor 201 of the second annular conductor 20, a second connecting portion 212 connected to the one end portion 912a of the winding 912 and the coupling portion 210 for coupling the first connecting portion 211 to the second connecting portion 212.

The coupling portion 210 has a first extended portion 214, a second extended portion 215 and an arc portion 213. The first extended portion 214 has an end portion 214a which extends through a bap between the first annular conductor 10 and the second annular conductor 20 toward one side in an axial direction of the second annular conductor 20 (toward the opposite side to the holding member 5). The second extended portion 215 extends inward in a radial direction of the second annular conductor 20 from the end portion 214a of the first extended portion 214 toward the second connecting portion 212. The arc portion 213 is formed between the first connecting portion 211 and a base end portion 214b of the first extended portion 214 so as to have an arc shape along a circumferential direction of the second annular conductor 20.

The first connecting portion 211 has a C-shape having a pair of protruding pieces 211a and 211b and a curved portion 211c, and is connected to the center conductor 201 of the second annular conductor 20 by crimping. The second connecting portion 212 has a pair of contact pieces 212a and 212b and a curved portion 212c and is connected to the one end portion 913a of the winding 913 by fusing.

The third connecting terminal 31 has a first connecting portion 311 connected to the center conductor 301 of the third annular conductor 30, a second connecting portion 312 connected to the one end portion 913a of the winding 913 and a coupling portion 310 for coupling the first connecting portion 311 to the second connecting portion 312 in the same manner as the first and second connecting terminals 11 and 12 but the shape of the coupling portion 310 is different from those of the coupling portions 110 and 210 of the first and second connecting terminals 11 and 12.

The coupling portion 310 has a first extended portion 314, a second extended portion 315 and an arc portion 313. The first extended portion 314 has an end portion 314a which extends through a gap between the second annular conductor 20 and the third annular conductor 30 toward one side in an axial direction of the third annular conductor 30 (toward the opposite side to the holding member 5). The second extended portion 315 extends inward in a radial direction of the third annular conductor 30 from the end portion 314a of the first extended portion 314 toward the second connecting portion 312. The arc portion 313 is formed between the first connecting portion 311 and a base end portion 314b of the first extended portion 314 so as to have an arc shape along a circumferential direction of the third annular conductor 30.

The second extended portion 315 has a first coupling portion 315a connected to an end portion of the first extended portion 314 and extending in the circumferential direction of the third annular conductor 30, a second coupling portion 315b extending inward in the radial direction of the third annular conductor 30 from an end portion of the first coupling portion 315a, a third coupling portion 315c extending in the circumferential direction of the third annular conductor 30 from an end portion of the second coupling portion 315b so as to face the first coupling portion 315a, and a fourth coupling portion 315d extending inward in the radial direction of the third annular conductor 30 from an end portion of the third coupling portion 315c.

The first connecting portion 311 has a C-shape having a pair of protruding pieces 311a and 311b and a curved portion 311c, and is connected to the center conductor 301 of the third annular conductor 30 by crimping. The second connecting portion 312 has a pair of contact pieces 312a and 312b and a curved portion 312c and is connected to the one end portion 913a of the winding 913 by fusing.

The second connecting portions 112, 212 and 312 of the first to third connecting terminals 11, 21 and 31 have the same structure. Of those, the second connecting portion 212 of the second connecting terminal 21 will be described in detail in reference to FIGS. 4A and 4B. In the first embodiment, the winding 912 is a rectangular copper wire having a rectangular cross section as shown in FIG. 4A and the pair of contact pieces 212a and 212b face each other along a long side on the rectangular cross section. The contact piece 212a has a contact surface 212a' in contact with the one end portion 912a of the winding 912 and the contact piece 212b has a contact surface 212b' also in contact with the one end portion 912a of the winding 912. The contact surfaces 212a' and 212b' face each other with the one end portion 912a of the winding 912 in between. The second connecting portion 212 opens outward in the radial direction of the second annular conductor 20 as viewed from an extending direction of the one end portion 912a of the winding 912.

Meanwhile, a thickness direction of the conductive member in the first extended portion 114 of the first connecting terminal 11, the first extended portion 214 of the second connecting terminal 21 and the first extended portion 314 of the third connecting terminal 31 is along the radial direction of the first to third annular conductors 10, 20 and 30.

In the electric motor 9 configured as described above, the first to third power supply terminals 21, 22 and 32 are connected to the non-illustrated inverter and three-phase alternating current output from the inverter is supplied to the one end portions 911a, 912a and 913a of the windings 911, 912 and 913 respectively via the second connecting portions 112, 212 and 312 of the first to third connecting terminals 11, 21 and 31 of the first to third bus rings 1 to 3. The other end portions 911b, 912b, 913b of the windings 911, 912 and 913 are connected to the fourth bus ring 4 as a neutral phase and the rotor 92 is rotated with respect to the stator 91 by a rotating magnetic field generated in the windings 911, 912 and 913 by the three-phase alternating current.

Functions and Effects of the First Embodiment

The following functions and effects are obtained in the first embodiment.

(1) Since the second connecting portions 112, 212 and 312 connected to the windings 911, 912 and 913 are formed at end portions of the second extended portions 115, 215 and 315 which extends inward in the radial direction of the first to third annular conductors 10, 20 and 30, it is easy to connect the second connecting portions 112, 212 and 312 to the one end portions 911*a*, 912*a* and 913*a* of the windings 911, 912 and 913 which are located further inside of the first annular conductor 10.

(2) Since the arc portions 113, 213 and 313 of the first to third connecting terminals 11, 21 and 31 are formed in an arc shape along the circumferential direction of the first to third annular conductors 10, 20, 30 and the arcuate conductor 4*a*, an increase in radial size of the first to fourth bus rings 1 to 4 is suppressed.

(3) Since a thickness direction of the conductive member in the first extended portions 114, 214 and 314 of the first to third connecting terminals 11, 21 and 31 is along the radial direction of the first to third annular conductors 10, 20 and 30, it is possible to reduce a gap between the first annular conductor 10 and the second annular conductor and a gap between the second annular conductor 20 and the third annular conductor 30. That is, as compared to the case where a width direction of the conductive member in the first extended portions 114, 214 and 314 of the first to third connecting terminals 11, 21 and 31 is along the radial direction of the first to third annular conductors 10, 20 and 30, it is possible to reduce a radial size of the first to third annular conductors 10, 20 and 30 by a difference between width and thickness. This leads to suppression of an increase in radial size of the first to third bus rings 1 to 3.

(4) Since the second connecting portions 112, 212 and 312 each have a shape formed by folding at a radially inward end portion to extend back toward the radially outer side, it is easy to shape and bend the conductive member. In addition, since the second connecting portions 112, 212 and 312 are formed continuously with the second extended portions 115, 215 and 315, height of the second connecting portions 112, 212 and 312 in the axial direction of the first to third annular conductors 10, 20 and 30 is equal to height of the second extended portions 115, 215 and 315 in the axial direction of the first to third annular conductors 10, 20 and 30. Therefore, it is possible to reduce height (thickness) of the first to third bus rings 1 to 3 in the axial direction and thus to make the electric motor 9 thinner.

Modification

Figure 5:
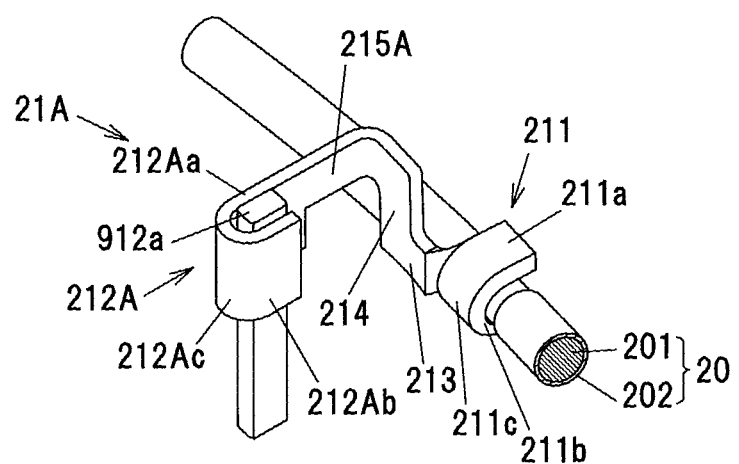
FIG. 5 is a perspective view showing a second connecting terminal and the periphery thereof in a modification of the first embodiment.

FIG. 5 is a perspective view showing a second connecting terminal 21A and the periphery thereof in a modification of the first embodiment.

Note that, in the modification and below-described second and third embodiments, constituent elements having the same functions as those described in the first embodiment are denoted by the same or corresponding reference numerals and names, and the explanation thereof will be omitted.

A second connecting portion 212A of the second connecting terminal 21A in the modification has a different shape from the second connecting portion 212 in the first embodiment. In more detail, a pair of contact pieces 212Aa and 212Ab are extended toward the holding member 5 along an extending direction of the winding 912. A width (height in the extending direction of the winding 912) of the conductive member of the pair of contact pieces 212Aa and 212Ab is greater than a width (height in the axial direction of the second annular conductor 20) of a second extended portion 215A. Therefore, an area of contact between the pair of contact pieces 212Aa, 212Ab and the one end portion 912*a* of the winding 912 is greater than an area of contact between the pair of contact pieces 212*a*, 212*b* and the one end portion 912*a* of the winding 912 in the first embodiment.

The modification also achieves the same functions and effects as the functions and effects (1) to (4) described in the first embodiment. In addition, since the area of contact between the second connecting portion 212A and the winding 912 is large, the second connecting terminal 21A is connected to the winding 912 more reliably. Note that, the same applies to a first connecting terminal 11A and a third connecting terminal 31A.

Second Embodiment

Figure 6A:
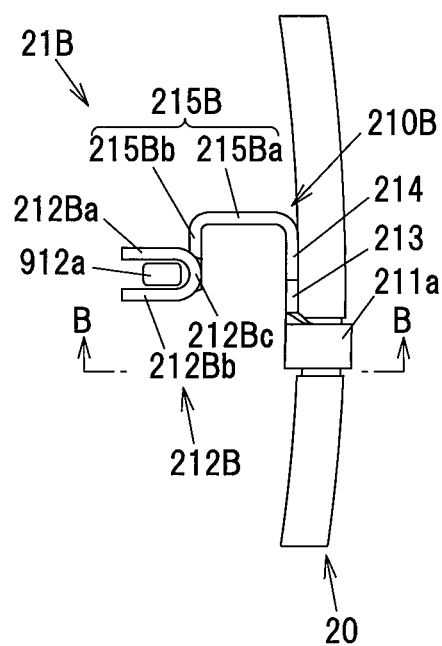
Figure 6B:
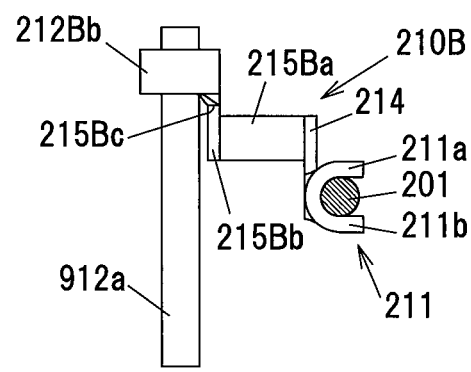

FIGS. 6A and 6B show a second connecting terminal 21B and the periphery thereof in the second embodiment of the invention, wherein FIG. 6A is a top view and FIG. 6B is a cross sectional view taken on line B-B of FIG. 6A.

A second connecting portion 212B and a second extended portion 215B of the second connecting terminal 21B in the second embodiment have different shapes from the second connecting portion 212 and the second extended portion 215 in the first embodiment. It is described in more detail below.

The second connecting portion 212B has a pair of contact pieces 212Ba and 212Bb facing each other with the one end portion 912*a* of the winding 912 therebetween and a curved portion 212Bc which has a semicircular cross section and is interposed between the contact pieces 212Ba and 212Bb. The second connecting portion 212B opens inward in the radial direction of the second annular conductor 20 as viewed from the extending direction of the one end portion 912*a* of the winding 912.

The second extended portion 215B has a first coupling portion 215Ba extending inward in the radial direction of the second annular conductor 20 from an end portion of the first extended portion 214, a second coupling portion 215Bb extending in the circumferential direction of the second annular conductor 20 from an end portion of the first coupling portion 215Ba so as to face the first extended portion 214, and a base portion 215Bc which extends in the axial direction of the second annular conductor 20 from an upper edge of the second coupling portion 215Bb and is connected to the curved portion 212Bc of the second connecting portion 212B.

The second embodiment achieves the same functions and effects as the functions and effects (1) to (3) described in the first embodiment.

Third Embodiment

Figure 7A:
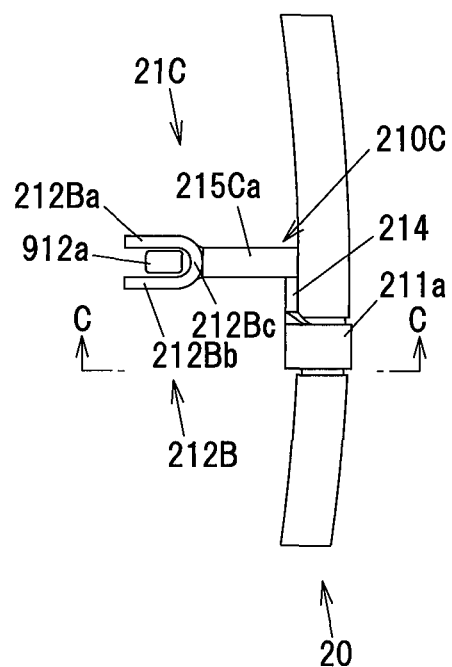
Figure 7B:
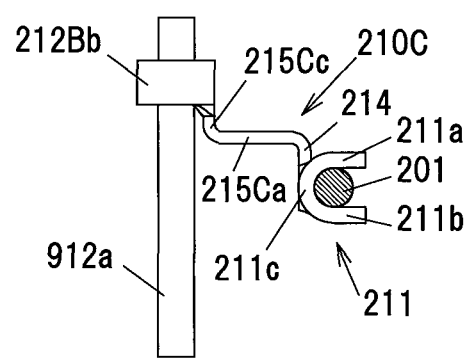

FIGS. 7A and 7B show a second connecting terminal 21C and the periphery thereof in the third embodiment of the invention, wherein FIG. 7A is a top view and FIG. 7B is a cross sectional view taken on line C-C of FIG. 7A.

A coupling portion 210C of the second connecting terminal 21C in the third embodiment has a different shape from the coupling portion 210B in the second embodiment. In more detail, the coupling portion 210C has the first extended portion 214 extending from the first connecting portion 211 in the axial direction of the second annular conductor 20, a second extended portion 215Ca extending inward in the radial direction of the second annular conductor 20 from the end portion 214*a* of the first extended portion 214, and a base portion 215Cc which extends in the axial direction of the second annular conductor 20 from an end portion of the extended portion 215Ca and is connected to the curved portion 212Bc of the second connecting portion 212B. As shown in FIGS. 7A and 7B, in the second extended portion 215Ca, a width direction of the conductive member is along the circumferential direction of the second annular conductor 20 and a thickness direction of the conductive member is along the axial direction of the second annular conductor 20.

The third embodiment achieves the same functions and effects as the functions and effects (1) to (3) described in the first embodiment. In addition, since a thickness direction of the conductive member in the second extended portion 215Ca is along the axial direction of the second annular conductor 20, the axial size of the second bus ring 2 can be reduced.

Summary of the Embodiments

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] An electricity collection and distribution ring (90), comprising: a plurality of bus rings (first to third bus rings 1 to 3) for collecting and distributing currents from/to multiple-phase windings (911, 912, 913) wound around a plurality of circularly-arranged teeth (910), wherein the plurality of bus rings (first to third bus rings 1 to 3) comprise a plurality of annular conductive bodies (first to third annular conductors 10, 20, 30) each formed by covering a center conductor (101, 201, 301) with an insulation (102, 202, 302) and a plurality of connecting terminals (first to third connecting terminals 11, 21, 31) provided on the annular conductive bodies (first to third annular conductors 10, 20, 30) at a plurality of circumferential positions, the plurality of annular conductive bodies (first to third annular conductors 10, 20, 30) are arranged concentrically and parallel in a radial direction, the plurality of connecting terminals (first to third connecting terminals 11, 21, 31) each comprise a first connecting portion (111, 211, 311) connected to the center conductor, a second connecting portion (112, 212, 312) connected to the winding (911, 912, 913) and a coupling portion (110, 210, 310) for coupling the first connecting portion (111, 211, 311) to the second connecting portion (112, 212, 312), the coupling portion (110, 210, 310) comprises a first extended portion (114, 214, 314) and a second extended portion (115, 215, 315), the first extended portion (114, 214, 314) having an end portion (114*a*, 214*a*, 314*a*) extending through a gap between the plurality of annular conductive bodies (first to third annular conductors 10, 20, 30) toward one side in an axial direction of the plurality of annular conductive bodies (first to third annular conductors 10, 20, 30) and the second extended portion (115, 215, 315) extending from the end portion (114*a*, 214*a*, 314*a*) of the first extended portion (114, 214, 314) toward one side in a radial direction of the plurality of annular conductive bodies (first to third annular conductors 10, 20, 30), and the second connecting portion (112, 212, 312) is formed at an end portion of the second extended portion (115, 215, 315) on one side in the radial direction.

[2] The electricity collection and distribution ring (90) described in the [1], wherein the second connecting portion (112, 212, 312) comprises a folded-back piece (contact piece 112*b*, 212*b*, 312*b*) formed by folding at an end portion on one side in the radial direction to extend back toward another side in the radial direction.

[3] The electricity collection and distribution ring (90) described in the [1] or [2], wherein the coupling portion (110, 210, 310) comprises an arc portion (113, 213, 313) between the first connection portion (111, 211, 311) and a base end portion (114*b*, 214*b*, 314*b*) of the first extended portion (114, 214, 314), the arc portion (113, 213, 313) being formed in an arc shape along a circumferential direction of the plurality of annular conductive bodies (first to third annular conductors 10, 20, 30).

[4] The electricity collection and distribution ring (90) described in one of the [1] to [3], wherein the plurality of connecting terminals (first to third connecting terminals 11, 21, 31) are each formed by bending a plate-shaped conductive member, and the coupling portion (110, 210, 310) is arranged between the plurality of annular conductive bodies (first to third annular conductors 10, 20, 30) so that a thickness direction of the conductive member in the first extended portion (114, 214, 314) is along the radial direction of the plurality of annular conductive bodies (first to third annular conductors 10, 20, 30).

[5] An electric motor (9), comprising: the electricity collection and distribution ring (90) described in one of the [1] to [4]; a stator (91) comprising the plurality of teeth (910) and the multiple-phase windings (911, 921, 913) wound therearound; and a rotor (92) that is rotated with respect to the stator (91) by a magnetic field of the multiple-phase winding (911, 921, 913).

Although the embodiments of the invention have been described, the invention according to claims is not to be limited to the above-mentioned embodiments. Further, please note that all combinations of the features described in the embodiments are not necessary to solve the problem of the invention.

Although the first to third connecting terminals are each formed of a plate-shaped conductive member in the embodiments, it is not limited thereto. A conductive member having, e.g., a circular cross section may be used and the shape thereof is not specifically limited.

Although the contact surfaces 212*a*' and 212*b*' face each other in parallel in the embodiments, it is not limited thereto as long as the one end portion 912*a* of the winding 912 is sandwiched therebetween.

What is claimed is:

1. An electricity collection and distribution ring, comprising
   a plurality of bus rings for collecting and distributing currents from/to multiple-phase windings wound around a plurality of circularly-arranged teeth,
   wherein the plurality of bus rings comprise a plurality of annular conductive bodies each formed by covering a center conductor with an insulation and a plurality of connecting terminals provided on the annular conductive bodies at a plurality of circumferential positions,
   wherein the plurality of annular conductive bodies are arranged concentrically and parallel in a radial direction,
   wherein the plurality of connecting terminals each comprise a first connecting portion connected to the center conductor, a second connecting portion connected to the winding and a coupling portion for coupling the first and second connecting portions,
   wherein the coupling portion comprises first and second extended portions, the first extended portion comprising an end portion extending through a gap between the plurality of annular conductive bodies toward one side in an axial direction of the plurality of annular conductive bodies and the second extended portion extending from the end portion of the first extended portion toward one side in a radial direction of the plurality of annular conductive bodies, and
   wherein the second connecting portion is formed at an end portion of the second extended portion on one side in the radial direction.

2. The electricity collection and distribution ring according to claim 1, wherein the second connecting portion comprises a folded-back piece formed by folding at an end portion on one side in the radial direction to extend back toward another side in the radial direction.

3. The electricity collection and distribution ring according to claim 1, wherein the coupling portion further comprises an arc portion between a first connection portion and a base end portion of the first extended portion, the arc portion being formed in an arc shape along a circumferential direction of the plurality of annular conductive bodies.

4. The electricity collection and distribution ring according to claim 1, wherein the plurality of connecting terminals are each formed by bending a plate-shaped conductive member, and wherein the coupling portion is arranged between the plurality of annular conductive bodies so that a thickness direction of the conductive member in the first extended portion is along the radial direction of the plurality of annular conductive bodies.

5. An electric motor, comprising: the electricity collection and distribution ring according to claim 1; a stator comprising the plurality of teeth and the multiple-phase windings wound therearound; and a rotor that is rotated with respect to the stator by a magnetic field of the multiple-phase winding.

* * * * *